United States Patent
Ohkido et al.

(10) Patent No.: US 8,273,456 B2
(45) Date of Patent: Sep. 25, 2012

(54) TWO-PART THERMOCURABLE POLYIMIDE RESIN COMPOSITION AND CURED PRODUCT THEREOF

(75) Inventors: Masahito Ohkido, Okayama (JP); Wataru Ueno, Tokyo (JP); Jitsuo Oishi, Kanagawa (JP); Shuta Kihara, Kanagawa (JP)

(73) Assignee: Mitsubishi Gas Chemical Company, Inc, Tokyo (JP)

( * ) Notice: Subject to any disclaimer, the term of this patent is extended or adjusted under 35 U.S.C. 154(b) by 510 days.

(21) Appl. No.: 12/444,192

(22) PCT Filed: Oct. 3, 2007

(86) PCT No.: PCT/JP2007/069373
§ 371 (c)(1),
(2), (4) Date: Jun. 4, 2009

(87) PCT Pub. No.: WO2008/041723
PCT Pub. Date: Apr. 10, 2008

(65) Prior Publication Data
US 2010/0029893 A1   Feb. 4, 2010

(30) Foreign Application Priority Data
Oct. 4, 2006   (JP) .................................. 2006-273130

(51) Int. Cl.
*B32B 27/00*   (2006.01)
(52) U.S. Cl. .................................................... 428/411.1
(58) Field of Classification Search .................. 524/262; 428/411.1
See application file for complete search history.

(56) References Cited

U.S. PATENT DOCUMENTS

| | | | |
|---|---|---|---|
| 3,983,298 A | | 9/1976 | Hahn et al. |
| 4,116,937 A | * | 9/1978 | Jones et al. .................... 528/170 |
| 4,271,288 A | * | 6/1981 | Woo ............................... 528/353 |
| 4,281,102 A | * | 7/1981 | Frosch et al. ................... 528/229 |
| 4,543,295 A | * | 9/1985 | St. Clair et al. ............... 428/458 |
| 5,004,774 A | * | 4/1991 | Yeo et al. ....................... 524/262 |
| 5,348,830 A | * | 9/1994 | Sacripante .................. 430/109.5 |
| 5,411,831 A | * | 5/1995 | Sacripante et al. ........ 430/109.5 |
| 5,413,888 A | * | 5/1995 | Sacripante et al. ........ 430/109.5 |
| 5,512,401 A | * | 4/1996 | Sacripante et al. ........ 430/109.5 |
| 5,552,254 A | * | 9/1996 | Mychajlowsky et al. .. 430/109.5 |
| 6,060,215 A | * | 5/2000 | Amanokura et al. ....... 430/281.1 |
| 7,078,477 B2 | * | 7/2006 | Oguro et al. .................. 528/336 |
| 2006/0141258 A1 | * | 6/2006 | Terada et al. ............... 428/411.1 |
| 2009/0306306 A1 | * | 12/2009 | Ohkido et al. ................ 525/410 |

FOREIGN PATENT DOCUMENTS

| | | |
|---|---|---|
| EP | 2009058 | 12/2008 |
| JP | 54-37907 | 11/1979 |
| JP | 02-024323 | 1/1990 |
| JP | 05-032950 | 2/1993 |
| JP | 05-287075 | 11/1993 |
| JP | 2005-015629 | 1/2005 |
| JP | 2006-096825 | 4/2006 |
| JP | 2006-143997 | 6/2006 |
| JP | 2008-308553 | 12/2008 |
| WO | 2007/119854 A1 | 10/2008 |

OTHER PUBLICATIONS

Search report from E.P.O. that issued with respect to patent family member European Patent Application No. 07829112.7 on Jul. 13, 2011, mail date is Jul. 13, 2011.

\* cited by examiner

*Primary Examiner* — James J Seidleck
*Assistant Examiner* — Peter A Salamon
(74) *Attorney, Agent, or Firm* — Greenblum & Bernstein, P.L.C.

(57) ABSTRACT

It relates to a highly heat resistant thermosetting polyimide resin composition that is cured at a temperature of 150° C. or less, and provides a cured product that generates a less amount of decomposed gas even under heating to 250° C., and has flexibility and adhesiveness.
A two-component thermosetting polyimide resin composition containing a liquid A containing a polyimide (a) having a main chain constituted by a repeating unit having a polyoxyalkylenediamine structure with amino groups on both ends thereof, and a liquid B containing a bismaleimide compound, and a cured product of a thermosetting polyimide resin composition obtained by mixing these two liquids and curing the mixture under heating.

16 Claims, No Drawings

US 8,273,456 B2

TWO-PART THERMOCURABLE POLYIMIDE RESIN COMPOSITION AND CURED PRODUCT THEREOF

TECHNICAL FIELD

The present invention relates to a two-component polyimide resin composition that has high heat resistance and thermosetting property, and a cured product thereof.

BACKGROUND ART

A fluorine-containing adhesive and a silicone adhesive have been known as an adhesive having heat resistance to 200° C. or higher. A fluorine-containing adhesive is an adhesive that has the best heat resistance, but has a problem that it is considerably expensive. A silicone adhesive is used in widespread fields since it is inexpensive and is excellent in heat resistance, but has a problem that it generates siloxane gas, which causes insulation failure, upon exposing to a high environmental temperature of 250° C. or higher for a prolonged period of time. A silicone adhesive having been used includes a peroxide curing type and an addition reaction curing type. A peroxide curing type silicone adhesive uses an organic peroxide, such as benzoyl peroxide and the like, as a curing agent, and requires a high temperature of 150° C. or higher for curing, as a result, the use thereof involves a problem that it is difficult to apply to a substrate that has poor heat resistance. An addition reaction curing type silicone adhesive undergoes crosslinking through addition reaction of an SiH group and an alkenyl group with a platinum catalyst (see, for example, Patent Document 1), and can be cured at a low temperature, whereby it is suitable for applying to a substrate that is poor in heat resistance. However, the adhesive causes gradual progress of the addition reaction and decrease in amount of the SiH group as a crosslinking agent through consumption thereof in the processing solution before applying to the substrate, thereby suffers from the problems such that not only the adhesion characteristics are fluctuated, but also increase in viscosity or gelation of the processing solution is caused, and the curing property of the adhesive is lowered, in any case, the adhesive is not cured at all, with the lapse of time. There is a demand in market for a heat resistant adhesive that is of lower cost than the fluorine-containing adhesive and is not deteriorated even at a high temperature of 250° C., but it is the current situation that no sufficiently satisfactory product has been obtained.

A polyimide resin has been widely used as engineering plastics excellent in heat resistance, and in particular, a polyimide resin obtained by reacting a bismaleimide compound and an aromatic diamine as raw materials is being widely used as a thermosetting polyimide resin for an electric insulating material and the like.

It is known that a cured product of a thermosetting polyimide resin formed with polyoxyalkylene bismaleimide, which is an aliphatic bismaleimide, an aromatic bismaleimide and an aromatic diamine as raw materials has not only heat resistance but also adhesiveness (see, for example, Patent Document 2).

However, such a high temperature as 150° C. or higher is required for obtaining the cured product by reacting a bismaleimide compound and an aromatic diamine, and thus there is the similar problem that it is difficult to apply to a substrate that has poor heat resistance.

[Patent Document 1] JP-B-54-37907
[Patent Document 2] U.S. Pat. No. 4,116,937

DISCLOSURE OF THE INVENTION

Problems to be Solved by the Invention

The present invention has been made in view of the aforementioned circumstances, and a problem to be solved thereof is to provide a highly heat resistant thermosetting polyimide resin composition that is cured at a temperature of 150° C. or less, and provides a cured product that generates a less amount of decomposed gas even under heating to 250° C., and has flexibility and adhesiveness.

Means for Solving the Problems

The inventors have made earnest investigations for solving the problems. As a result, it has been found that a two-component thermosetting polyimide resin composition, which contains a liquid A containing a polyimide (a) having a main chain constituted by a repeating unit having a polyoxyalkylenediamine structure with amino groups on both ends thereof, and a liquid B containing a bismaleimide compound, is cured at a temperature of 150° C. or less, and a cured product thereof not only has flexibility and heat resistance, for example, a less amount of decomposed gas is generated even under heating to 250° C., but also has adhesiveness, thereby completing the present invention.

Accordingly, the present invention relates to:

(i) A two-component thermosetting polyimide resin composition comprising: a liquid A containing a polyimide (a) which is produced by mixing a tetracarboxylic acid component containing at least one compound selected from a tetracarboxylic dianhydride represented by formula (1), a tetracarboxylic acid and a derivative of the tetracarboxylic acid represented by formula (2), with a polyoxyalkylenediamine represented by formula (3), in such a manner that a molar number of the polyoxyalkylenediamine is excessive to a molar number of the tetracarboxylic acid component, and by being subjected to reaction of the mixture under heating; and a liquid B containing a bismaleimide compound represented by formula (4) and a solvent, (ii) a thermosetting polyimide resin composition which is produced by mixing the liquid A and the liquid B of the two-component thermosetting polyimide resin composition according to the item (i), (iii) a cured product having adhesiveness which is produced by curing under heating the thermosetting polyimide resin composition according to the item (ii) at from 50 to 150° C. for from 0.5 to 10 hours, and (iv) a liquid polyimide which is produced by mixing a tetracarboxylic acid component containing at least one compound selected from a tetracarboxylic dianhydride represented by formula (1), a tetracarboxylic acid and a derivative of the tetracarboxylic acid represented by formula (2), with a polyoxyalkylenediamine represented by formula (3) in such a manner that a molar number of the polyoxyalkylenediamine is excessive to a molar number of the tetracarboxylic acid component, and by being subjected to reaction of the mixture under heating.

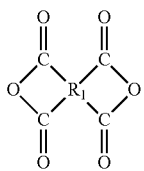

(1)

(wherein $R_1$ represents a tetravalent organic group.)

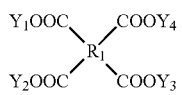

(2)

(wherein $R_1$ represents a tetravalent organic group; and $Y_1$ to $Y_4$ each independently represent hydrogen or a hydrocarbon group having from 1 to 8 carbon atoms.)

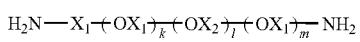

(3)

(wherein $X_1$ and $X_2$ each represents a $C_1$ to $C_4$ alkylene group; k and m each represent a repeating number of the $OX_1$ unit; and l represents a repeating number of the $OX_2$ unit, where k+m is a number within a range of from 1 to 90 in terms of number average polymerization degree (provided that m is not 0), and l is a number within a range of from 0 to 80 in terms of number average polymerization degree.)

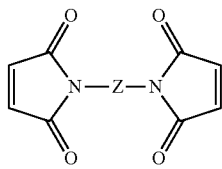

(4)

(wherein Z represents a divalent organic group.)

Effect of the Invention

The thermosetting polyimide resin composition of the present invention is a two-component type, and a cured product can be obtained by mixing the two components, and then reacting at a temperature of 150° C. or less. The cured product has such characteristics that it not only has flexibility and excellent heat resistance such as generation of a less amount of decomposed gas even under heating to 250° C., but also has adhesiveness, and therefore it is expected to be applied to uses requiring both heat resistance and adhesiveness. The polyimide (a) can be synthesized as a liquid substance in the absence of a solvent, and can be obtained as a liquid polyimide. No report of a liquid polyimide has been found. The polyimide (a) has good affinity to a low boiling point solvent, such as tetrahydrofuran, acetone and the like, and thus can be diluted therewith. Accordingly, a high concentration, or solventless if desired, thermosetting polyimide resin composition with a low boiling point solvent can be obtained, thereby providing well balanced characteristics in rationalization of working process by reducing the drying time on providing a cured product, and in safety and health by reducing the amount of solvent discharged on drying.

BEST MODE FOR CARRYING OUT THE INVENTION

The present invention will be described in detail below.

In general, a polyimide is produced with a tetracarboxylic dianhydride as a tetracarboxylic acid compound, but in the present invention, in addition to the tetracarboxylic dianhydride, a tetracarboxylic acid or a derivative thereof, such as an ester compound of a tetracarboxylic acid and an alcohol, and the like, is used to produce a practical polyimide. The present invention is advantageous in production equipments and cost since a tetracarboxylic acid can be used as it is.

The two-component thermosetting polyimide resin composition and a cured thereof of the present invention are those shown in the aforementioned items (i) to (iii), and they are preferably obtained in a method containing the following steps (1) to (4).

Step (1): A step of reacting a tetracarboxylic acid component and a polyoxyalkylenediamine under heating to synthesize a polyimide (a), which is mixed with a solvent depending on necessity, thereby producing a liquid A Step (2): A step of dissolving a bismaleimide in a solvent, thereby providing a liquid B Step (3): A step of mixing the liquid A and the liquid B, thereby producing a thermosetting polyimide resin composition Step (4): A step of curing the thermosetting polyimide resin composition obtained in the step (3) under heating, thereby providing a cured product Step (1)

Examples of the tetracarboxylic dianhydride of formula (1) used on providing the liquid A in the step (1) of the present invention include an aliphatic tetracarboxylic dianhydride, an aromatic tetracarboxylic dianhydride and the like, and in formula (1), $R_1$ represents a tetravalent organic group. The tetravalent organic group is preferably at least one selected from a tetravalent group derived from cyclohexane and a tetravalent group derived from benzene in terms of improvement in the solubility of the polyimide (a) in a solvent or liquefaction of the polyimide (a) itself.

In the tetracarboxylic dianhydride of formula (1), examples of the aliphatic tetracarboxylic dianhydride include 1,2,4,5-cyclohexanetetracarboxylic dianhydride, 1,2,3,4-butanetetracarboxylic dianhydride, 1,2,3,4-cyclobutanetetracarboxylic dianhydride, 1,2,3,4-cyclopentanetetracarboxylic dianhydride, bicyclo[2.2.2]oct-7-ene2,3,5,6-tetracarboxylic dianhydride, dicyclohexyltetracarboxylic dianhydride and the like.

In the tetracarboxylic dianhydride of formula (1), examples of the aromatic tetracarboxylic dianhydride include pyromellitic dianhydride, 3,3',4,4'-biphenyltetracarboxylic dianhydride, 2,3,3',4'-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, bis(3,4-dicarboxyphenyl)sulfone dianhydride, bis(3,4-dicarboxyphenyl)ether dianhydride, bis(2,3-dicarboxyphenyl)ether dianhydride, 3,3',4,4'-benzophenonetetracarboxylic dianhydride, 2,2',3,3'-benzophenonetetracarboxylic dianhydride, 4,4'-(p-phenylenedioxy)diphthalic dianhydride, 4,4'-(m-phenylenedioxy)diphthalic dianhydride, ethylenetetracarboxylic dianhydride, 3-carboxymethyl-1,2, 4-cyclopentanetricarboxylic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride and the like.

Examples of the tetracarboxylic acid and a derivative thereof of formula (2) include an aliphatic tetracarboxylic acid and a derivative thereof and an aromatic tetracarboxylic acid and a derivative thereof, and in formula (2), $R_1$ is the same as in formula (1), and $Y_1$ to $Y_4$ each independently represents hydrogen or a hydrocarbon group having from 1 to 8 carbon atoms. Examples of the hydrocarbon group having from 1 to 8 carbon atoms include a methyl group, an ethyl group, a propyl group, an isopropyl group, a butyl group, a t-butyl group, a hexyl group, a cyclohexyl group, a phenyl group and the like, but it is not limited thereto.

In the tetracarboxylic acid and a derivative thereof of formula (2), examples of the aliphatic tetracarboxylic acid and a derivative thereof include 1,2,4,5-cyclohexanetetracarboxylic acid, 1,2,3,4-butanetetracarboxylic acid, 1,2,3,4-cyclobutanetetracarboxylic acid, 1,2,3,4-cyclopentanetetracarboxylic acid, bicyclo[2.2.2]oct-7-ene2,3,5,6-tetracarboxylic acid, dicyclohexyltetracarboxylic acid and the like, and also include ester compounds thereof with an alcohol having from 1 to 8 carbon atoms.

In the tetracarboxylic acid and a derivative thereof of formula (2), examples of the aromatic tetracarboxylic acid and a derivative thereof include pyromellitic acid, 3,3',4,4'-biphenyltetracarboxylic acid, 2,3,3',4'-biphenyltetracarboxylic acid, 2,2-bis(3,4-dicarboxyphenyl)propane, 2,2-bis(2,3-dicarboxyphenyl)propane, 2,2-bis(3,4-dicarboxyphenyl)-1,1,1,3,3,3-hexafluoropropane, 2,2-bis(2,3-dicarboxyphenyl)-1,1,1,3,3,3-hexafluoropropane, bis(3,4-dicarboxyphenyl)sulfone, bis(3,4-dicarboxyphenyl)ether, bis(2,3-dicarboxyphenyl)ether, 3,3',4,4'-benzophenonetetracarboxylic acid, 2,2',3,3'-benzophenonetetracarboxylic acid, 4,4'-(p-phenylenedioxy)diphthalic acid, 4,4'-(m-phenylenedioxy)diphthalic acid, ethylenetetracarboxylic acid, 3-carboxymethyl-1,2,4-cyclopentanetricarboxylic acid, 1,1-bis(2,3-dicarboxyphenyl)ethane acid, bis(2,3-dicarboxyphenyl)methane, bis(3,4-dicarboxyphenyl)methane and the like, and also include ester compounds thereof with an alcohol having from 1 to 8 carbon atoms.

Among the tetracarboxylic anhydrides, the tetracarboxylic acids and the derivatives of the tetracarboxylic acids, one having a structure derived from cyclohexane and one having a structure derived from benzene are preferred since the solubility of the polyimide (a) in solvent is enhanced, and the polyimide (a) in a liquid state can be obtain, and one having a structure derived from cyclohexane is more preferred. Particularly preferred examples thereof include 1,2,4,5-cyclohexanetetracarboxylic dianhydride, 1,2,4,5-cyclohexanetetracarboxylic acid and alcohol esters thereof, which may be used solely or in combination of two or more thereof.

In the polyoxyalkylenediamine represented by formula (3) used in the present invention, $X_1$ and $X_2$ each represents a $C_1$ to $C_4$ alkylene group; k and m each represent a repeating number of the $OX_1$ unit; and l represents a repeating number of the $OX_2$ unit. Herein, k+m represents a number average polymerization degree that is a number within a range of from 1 to 90 (provided that m is not 0), and l represents a number average polymerization degree that is a number within a range of from 0 to 80.

Examples of the polyoxyalkylenediamine include polyoxypropylenediamine represented by formula (6) below, polyoxyethylenediamine represented by formula (7) below, polyoxybutylenediamine represented by formula (8) below and a copolymer containing plural molecules of polyoxyalkylene bonded at the amine ends thereof. Among these, polyoxypropylenediamine of formula (6) and, as a copolymer, a polyoxyalkylenediamine containing a skeleton derived from propylene oxide and ethylene oxide represented by formula (5) are preferred from the standpoint of heat resistance of a cured product of the thermosetting polyimide resin composition having adhesiveness of the present invention.

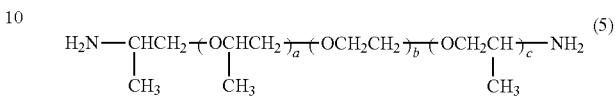

(wherein a and c each represent a repeating number of the propylene oxide unit; and b represents a repeating number of the ethylene oxide unit.)

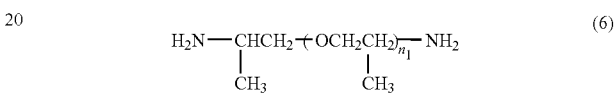

(wherein $n_1$ represents a repeating number of the propylene oxide unit.)

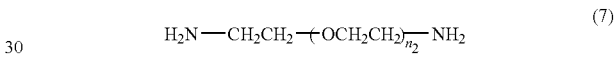

(wherein $n_2$ represents a repeating number of the ethylene oxide unit.)

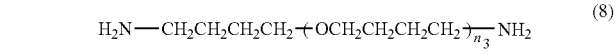

(wherein $n_3$ represents a repeating number of the butylene oxide unit.)

The thermosetting polyimide resin composition of the present invention exhibits adhesiveness owing to the use of the polyoxyalkylenediamine of formula (3) as a soft segment. The term "adhesiveness" referred in the present invention means such a property that it is adhered only by applying pressure slightly at ordinary temperature for a short period of time without the use of water, solvent, heat or the like, and the term "adhesion force" means a force required for peeling a test piece from an adherend with which the test piece has been in contact under slight pressure at ordinary temperature for a short period of time.

The molecular weight of the polyoxyalkylenediamine of formula (5) is preferably from 300 to 4,000 (the repeating number of propylene oxide (a+c) is from 1.0 to 9.4 in terms of number average polymerization degree (wherein c is not 0), and the repeating number of ethylene oxide (b) is from 3.7 to 79.8 in terms of number average polymerization degree), and more preferably from 600 to 2,000 (the repeating number of propylene oxide (a+c) is from 2.0 to 6.0, and preferably from 3.6 to 6.0, in terms of number average polymerization degree (wherein c is not 0), and the repeating number of ethylene oxide (b) is from 9.0 to 41.2, and preferably from 9.0 to 38.7, in terms of number average polymerization degree).

The molecular weight of the polyoxypropylenediamine of formula (6) is preferably from 230 to 4,000 (the repeating number of propylene oxide $n_1$ is from 2.6 to 68.0 in terms of number average polymerization degree), more preferably from 360 to 2,000 (the repeating number of propylene oxide $n_1$ is from 5.0 to 33.0 in terms of number average polymerization degree), and further preferably from 600 to 2,000 (the repeating number of propylene oxide $n_1$ is from 8.7 to 33.0 in terms of number average polymerization degree).

The molecular weight of the polyoxyethylenediamine of formula (7) is preferably from 300 to 4,000 (the repeating number of ethylene oxide $n_2$ is from 5.5 to 89.5 in terms of number average polymerization degree), and more preferably from 600 to 2,000 (the repeating number of ethylene oxide $n_2$ is from 12.3 to 44.1 in terms of number average polymerization degree).

The molecular weight of the polyoxybutylenediamine of formula (8) is preferably from 200 to 4,000 (the repeating number of butylene oxide $n_3$ is from 1.6 to 54.3 in terms of number average polymerization degree), and more preferably from 600 to 2,000 (the repeating number of butylene oxide $n_3$ is from 7.1 to 26.6 in terms of number average polymerization degree).

The polyimide (a) as a reaction product of the step (1) in the present invention is obtained in such a method that a tetracarboxylic acid component containing at least one compound selected from a tetracarboxylic dianhydride, a tetracarboxylic acid and a derivative of the tetracarboxylic acid is added to a polyoxyalkylenediamine, and imidation reaction is performed. The polyimide (a) is also obtained in such a method that the polyoxyalkylenediamine is added to the tetracarboxylic acid component, and imidation reaction is performed.

The polyimide (a) as a reaction product of the step (1) in the present invention is obtained by mixing the polyoxyalkylenediamine represented by formula (3) in an excessive amount with 1 mol of the tetracarboxylic acid component containing at least one compound selected from the tetracarboxylic dianhydride represented by formula (1), the tetracarboxylic acid and a derivative of the tetracarboxylic acid represented by formula (2), and it is preferably synthesized by adding the polyoxyalkylenediamine in a ratio of from 1.01 to 2 mol, and more preferably a ratio of from 1.25 to 2 mol, per 1 mol of the tetracarboxylic acid component. In this case, amino groups are preferably disposed at both ends of the reaction product. When the polyoxyalkylenediamine is mixed in a ratio of 1.01 mol or more with 1 mol of the tetracarboxylic acid component, both ends of the reaction product of the step (1) become amino groups derived from the polyoxyalkylenediamine component, which is preferred upon providing the thermosetting polyimide resin composition in the step (3) described later. When the polyoxyalkylenediamine is mixed in a ratio of 2 mol or less with 1 mol of the tetracarboxylic acid component, the amount of the polyoxyalkylenediamine component remaining unreacted is small, which is preferred in view of enhancing the heat resistance.

The polyimide (a) in the present invention can be obtained by performing thermal imidation reaction in the absence of a solvent, and the reaction may be performed in the presence of various kinds of organic solvent. Specifically, one kind or two or more kinds of solvents, such as N,N-dimethylacetamide, N-methyl-2-pyrrolidone, N,N-dimethylformamide, dimethylsulfoxide, hexamethylphosphoramide, tetramethylene sulfone and the like, may be used. Xylene or toluene may be added for performing azeotropic dehydration. The polyimide (a) after synthesis may be used after diluting with low boiling point solvent, such as tetrahydrofuran, acetone, methanol and the like.

The polyoxyalkylenediamine may be used after dissolving in the aforementioned organic solvent depending on necessity. The reaction temperature of the imidation reaction is preferably from 150 to 260° C., more preferably from 180 to 260° C., and further preferably from 180 to 200° C. Increase in molecular weight can be sufficiently achieved at a temperature within the range, thereby synthesizing a practical polyimide. It is also advantageous in cost.

The reaction time is preferably from 1 to 12 hours, and particularly preferably from 3 to 6 hours, from the same standpoint as the reaction temperature. The imidation reaction may be performed with toluene or xylene added as an azeotropic solvent. The formation of polyimide can be confirmed by characteristic absorption of an imide ring in an IR spectrum around 1,766 $cm^{-1}$ and 1,700 $cm^{-1}$.

In the bismaleimide compound of formula (4) used in the present invention, Z represents a divalent organic group. Examples of the divalent organic group include a divalent aliphatic group, such as a polyalkylene group, a polyoxyalkylene group, a xylylene group, and an alkyl substituted compound, a halogen substituted compound, a carboxy substituted compound, a hydroxyl substituted compound thereof and the like; a divalent alicyclic group derived from cyclohexane, dicyclohexylmethane, dimethylcyclohexane, isophorone, norbornane, and an alkyl substituted compound, a halogen substituted compound, a carboxy substituted compound, a hydroxyl substituted compound thereof and the like; a divalent aromatic group derived from benzene, naphthalene, biphenyl, diphenylmethane, diphenyl ether, diphenylsulfone, benzophenone, and an alkyl substituted compound, a halogen substituted compound, a carboxy substituted compound, a hydroxyl substituted compound thereof and the like; a divalent organic group formed by combining two or more of the divalent organic groups directly or through at least one bonding group selected from the group consisting of —O—, —$SO_2$—, —$CH_2$—, —$C(CH_3)_2$—, —$OSi(CH_3)_2$—, —$C_2H_4O$— and —S—, and the like.

The bismaleimide compound of formula (4) specifically includes the following. Examples thereof include N,N'-(4,4'-diphenylmethane)bismaleimide, N,N'-(4,4'-diphenyloxy) bismaleimide, N,N'-(4,4'-diphenylsulfone)bismaleimide, N,N'-p-phenylenebismaleimide, N,N'-m-phenylenebismaleimide, N,N'-2,4-tolylenebismaleimide, N,N'-2,6-tolylenebismaleimide, N,N'-ethylenebismaleimide, N,N'-hexamethylenebismaleimide, N,N'-(4,4'-(2,2-bis(4'',4'''-phenoxyphenyl)-isopropylidene))bismaleimide, N,N'-(4,4'-(2,2-bis(4'',4'''-phenoxyphenyl)-hexafluoroisopropylidene)) bismaleimide, N,N'-(4,4'-bis(3,5-dimethylphenyl)methane) bismaleimide, N,N'-(4,4'-bis(3,5-diethylphenyl)methane) bismaleimide, N,N'-(4,4'-(3-methyl-5-ethylphenyl)methane) bismaleimide, N,N'-(4,4'-bis(3,5-diisopropylphenyl) methane)bismaleimide, N,N'-(4,4'-dicyclohexylmethane) bismaleimide, N,N'-p-xylylenebismaleimide, N,N'-m-xylylenebismaleimide, N,N'-(1,3-dimethylenecyclohexane) bismaleimide, N,N'-(1,4-dimethylenecyclohexane) bismaleimide and the like.

Step (2)

As the bismaleimide compound, such a bismaleimide compound may be used that contains a polyoxyethylenediamine having both ends thereof being blocked with maleic anhydride, and examples thereof include a bismaleimide compound containing polyoxyethylenediamine having both ends thereof being blocked with maleic anhydride, a bismaleimide compound containing polyoxypropylenediamine having both ends thereof being blocked with maleic anhydride and a bismaleimide compound containing polyoxybutylenediamine having both ends thereof being blocked with maleic anhydride. Among these, preferred examples includes N,N'-(4,4'-diphenylmethane)bismaleimide represented by formula (9) and N,N'-(4,4'-bis(3-methyl-5-ethylphenyl)methane)bismaleimide represented by formula (10) from the standpoint of heat resistance and adhesiveness of the cured product of the thermosetting polyimide resin composition having adhesiveness of the present invention.

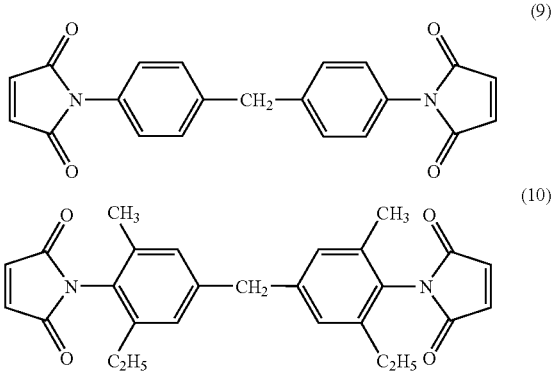

The liquid B in the step (2) in the present invention can be obtained in the following method. The bismaleimide compound and a solvent are mixed until a homogeneous liquid is obtained. The mixing temperature is preferably from 0 to 80° C., and more preferably from 20 to 60° C.

Examples of the solvent used upon providing the liquid B in the step (2) in the present invention include an amide solvent, such as N,N-dimethylacetamide, N-methyl-2-pyrrolidone, N,N-dimethylformamide, hexamethylphosphoramide and the like, a ketone solvent, such as methyl ethyl ketone, acetone and the like, a cyclic ketone solvent, such as cyclohexanone, cyclopentanone and the like, an cyclic ether solvent, such as 1,4-dioxane, 1,3-dioxolane, tetrahydrofuran and the like, acetonitrile, and the like. In particular, 1,3-dioxolane is preferably used from the standpoint of solubility to the bismaleimide compound and ease of vaporization of the solvent itself.

Step (3)

The thermosetting polyimide resin composition in the step (3) in the present invention can be obtained in the following method. The liquid A containing the polyimide (a) obtained in the step (1) and the liquid B containing the bismaleimide compound and the solvent obtained in the step (2) are mixed until a homogeneous liquid is obtained. The mixing temperature is preferably from 0 to 80° C., and more preferably from 20 to 60° C. A temperature within the range is preferred since a homogeneous liquid can be easily obtained.

Upon producing the thermosetting polyimide resin composition by mixing the liquid A and the liquid B in the step (3) in the present invention, the bismaleimide compound contained in the liquid B is preferably mixed in an amount of from 0.05 to 4 mol, and more preferably from 0.15 to 2 mol, with 1 mol of the unit derived from the tetracarboxylic acid component constituting the polyimide (a) contained in the liquid A upon mixing, which is preferred since such a thermosetting polyimide resin composition can be obtained that provides a cured product having flexibility and adhesiveness.

Accordingly, upon producing the thermosetting polyimide resin composition by mixing the liquid A and the liquid B in the step (3) in the present invention, the bismaleimide compound contained in the liquid B is preferably mixed in an amount within the aforementioned range with 1 mol of the unit derived from the tetracarboxylic acid component constituting the polyimide (a) contained in the liquid A upon mixing, which is preferred since the crosslinking density of the cured product obtained by curing the thermosetting polyimide resin composition under heating is high to provide a sufficient strength, and the flexibility of the cured product obtained by curing the thermosetting polyimide resin composition under heating is enhanced.

Step (4)

The cured product having adhesiveness of the thermosetting polyimide resin composition of the present invention can be obtained by curing under heating the thermosetting polyimide resin composition obtained by mixing the liquid A and the liquid B, and for example, the thermosetting polyimide resin composition may be cast in a film form on a substrate, such as glass, a metal, e.g., stainless steel, aluminum and the like, and the like, and cured under heating to provide a polyimide cured product. The curing temperature is preferably from 50 to 200° C., more preferably from 50 to 150° C., and further preferably from 100 to 150° C. The curing temperature is preferably within the range since a less amount of uncured part is formed, a sufficient adhesion force is obtained, and cohesion destruction does not occur upon peeling the adhesive layer from an adherend after adhering them each other. It is also advantageous in cost. The curing time is preferably from 0.1 to 10 hours, more preferably from 0.5 to 10 hours, and further preferably from 1.0 to 10 hours, from the same standpoint as the curing temperature. In the present invention, the curing temperature and the curing time are not limited to the aforementioned ranges. The cured product obtained by curing on a substrate under heating may be used as it remains on the substrate or may be used in a film form after peeling off from the substrate.

The cured product having adhesiveness of the thermosetting polyimide resin composition of the present invention corresponds to a material that is generally referred to as an adhesive. The adhesion force required for the cured product as an adhesive is about from 0.001 to 250 N per 25 mm in terms of 90° peeling adhesion force, and the cured product preferably can be used repeatedly. The suitable adhesion force and the necessary number of repeated use cannot be determined unconditionally since they vary depending on properties of the adherend, as well as uses and methods of uses of the cured product. Furthermore, the state where the adhesive remains on the surface of the adherend after the operation of peeling off the adhesive from the adherend is referred to as "adhesive deposit", and the difficulty in causing adhesion deposit is referred to as "adhesion deposit property". The adhesion deposit property is generally demanded to be good.

The cured product having adhesiveness of the thermosetting polyimide resin composition of the present invention has such characteristics as heat resistance, flexibility and adhesiveness at a high temperature. Accordingly, it can be applied to a wide range of industrial products including a heat resistant adhesive that is required to have flexibility and adhesiveness at a high temperature, such as an adhesive tape.

EXAMPLE

Examples will be described below, but the invention is not limited to the following examples. The measurement of properties and the like were performed according to the following methods.

Infrared Ray Absorption Spectrum

An IR spectrum was obtained with JIR-WINSPEC50 (infrared ray absorption spectrum), produced by JEOL Ltd.

Solution Viscosity

It was measured at 25° C. with a cone plate viscometer, Model TV-20, produced by Tokimec, Inc.

Thermogravimetric Analysis

By using a thermogravimetric analyzer (DTG-50), produced by Shimadzu Corporation, a specimen was increased in temperature from room temperature at a temperature increasing rate of 10° C. per minute under nitrogen stream, maintained at 200° C. for 30 minutes for removing water content, and then increased in temperature from 200° C. to 250° C. at 5° C. per minutes. Thereafter, it was maintained at 250° C. for 1 hour, and the weight decrease in terms of percent upon maintaining at 250° C. was obtained.

Adhesion Force on 90° Peeling

It was obtained according to JIS Z0237. A polyimide film, "Kapton 200H" (Model 22M11P0860), produced by Du Pont-Toray Co., Ltd., having a width of 25 mm, a length of 150 mm and a thickness of 50 μm was adhered to a cured product formed in a film form on an aluminum plate, and adhered under pressure reciprocating once a 2-kg rubber roller, and after allowing to stand for 30 minutes, Kapton 200H was pulled at an angle of 90° under conditions of a peeling rate of 300 mm/min at 23° C./50% RH, at which the adhesion force on 90° peeling (N per 25 mm) between the cured product and Kapton 200H was measured. The measuring equipments used were Digital Force Gauge ZP-5N, produced by Imada Co., Ltd., an electric sliding stand MX-500N, produced by Imada Co., Ltd., and a 90° peeling jig P90-200N.

Adhesion Deposit Property

Upon measuring the adhesion force on 90° peeling, the surface of Kapton 200H as the adherend was visually evaluated, and a specimen without adhesion deposit was evaluated as good, whereas a specimen with adhesion deposit was evaluated as poor.

Amino Group Concentration

The total amine value obtained by JIS K7237 was converted to an amino group concentration (meq/g) per 1 g of a specimen.

Synthesis Example 1

Synthesis of Polyimide (a1)

36.17 g (0.16 mol) of 1,2,4,5-cyclohexanetetracarboxylic dianhydride (HPMDA, available from Mitsubishi Gas Chemical Co., Inc.) and 193.32 g (0.20 mol) of ethylene oxide-propylene oxide copolymer bis(2-aminopropyl)ether (Jeffamine ED-900, a trade name, available from Mitsui Fine Chemical, Inc., molecular weight: 966.6 (calculated from amine value), a+c in formula (5): 2.5 (theoretical value), b in formula (5): 15.5 (theoretical value)) were charged under a nitrogen stream in a 500-mL five-neck round-bottom flask equipped with a thermometer, a stirrer, a nitrogen introducing tube, a dropping funnel with a side tube, a Dean-Stark apparatus and a condenser tube, and heated to 200° C. under stirring at 100 rpm to perform imidation reaction for 3 hours while removing produced water with the Dean-Stark apparatus. After lapsing 3 hours, it was confirmed that distillation off of water was terminated, and 5.76 g of water was recovered, followed by cooling to ordinary temperature. A polyimide (a1) in a liquid state at 25° C. was obtained. The IR spectrum of the polyimide (a1) showed characteristic absorption of an imide ring, v (C=O) 1,766 and 1,700 cm$^{-1}$, and thus formation of polyimide was confirmed. The polyimide (a1) had an amino group concentration of 0.37 (meq/g), and the residual amount of amino groups that were to be consumed by imidation was 0.5%.

Synthesis Example 2

Synthesis of Polyimide (a2)

35.30 g (0.16 mol) of pyromellitic dianhydride (PMDA, available from Mitsubishi Gas Chemical Co., Inc.) and 195.53 g (0.20 mol) of Jeffamine ED-900 were charged under a nitrogen stream in the same five-neck round-bottom flask as used in Synthesis Example 1, and heated to 200° C. under stirring at 100 rpm to perform imidation reaction for 3 hours while removing produced water with the Dean-Stark apparatus. After lapsing 3 hours, it was confirmed that distillation off of water was terminated, and 5.54 g of water was recovered, followed by cooling to ordinary temperature. A polyimide (a2) in a liquid state at 25° C. was obtained. The IR spectrum of the polyimide (a2) showed characteristic absorption of an imide ring, v (C=O) 1,770 and 1,720 cm$^{-1}$, and thus formation of polyimide was confirmed. The polyimide (a2) had an amino group concentration of 0.36 (meq/g), and the residual amount of amino groups that were to be consumed by imidation was 0.3%.

Synthesis Example 3

Synthesis of Polyimide (a3)

69.99 g (0.31 mol) of HPMDA and 166.26 g (0.39 mol) of propylene oxide polymer bis(2-aminopropyl)ether (Jeffamine D-400, a trade name, available from Mitsui Fine Chemical, Inc., molecular weight: 426.3 (calculated from amine value), $n_1$ in formula (6): 5 to 6) were charged under a nitrogen stream in the same five-neck round-bottom flask as used in Synthesis Example 1, and heated to 200° C. under stirring at 100 rpm to perform imidation reaction for 3 hours while removing produced water with the Dean-Stark apparatus. After lapsing 3 hours, it was confirmed that distillation off of water was terminated, and 11.03 g of water was recovered, followed by cooling to ordinary temperature. A polyimide (a3) in a liquid state at 25° C. was obtained. The IR spectrum of the polyimide (a3) showed characteristic absorption of an imide ring, v (C=O) 1,768 and 1,695 cm$^{-1}$, and thus formation of polyimide was confirmed. The polyimide (a3) had an amino group concentration of 0.71 (meq/g), and the residual amount of amino groups that were to be consumed by imidation was 0.6%.

Synthesis Example 4

Synthesis of Polyimide (a4)

41.18 g (0.16 mol) of 1,2,4,5-cyclohexanetetracarboxylic acid (HPMA, available from Mitsubishi Gas Chemical Co., Inc.), 194.69 g (0.20 mol) of Jeffamine ED-900 and 353.81 g of water were weighed in an autoclave equipped with a thermometer, a stirrer, a nitrogen introducing tube, a pressure gauge, a depressurizing valve and an extraction port, which was sufficiently replaced with nitrogen by repeating depressurization and deaeration, and then sealed. The content was gradually increased in temperature under stirring at 100 rpm. The inner pressure of the reaction system when the inner temperature reached 260° C. was 4.3 MPa (pressure gauge), and water and produced water were separated carefully from the depressurizing valve while maintaining the temperature and pressure. The state was retained for 3 hours. The recovered amount of water after lapsing 3 hours was 364.50 g. The content was cooled to ordinary temperature to provide a polyimide (a4) in a liquid state at 25° C. was obtained. The IR spectrum of the polyimide (a4) showed characteristic absorption of an imide ring, v (C=O) 1,766 and 1,700 cm$^{-1}$, and thus formation of polyimide was confirmed.

Synthesis Example 5

Synthesis of Polyimide (a5)

34.25 g (0.17 mol) of 4,4-diamino diphenyl ether (ODA, produced by Wakayama Seika Kogyo Co., Ltd.), 100.00 g of N-methyl-2-pyrrolidone (NMP, produced by Mitsubishi Chemical Corporation) and 0.69 g of TEA as a catalyst were stirred at 100 rpm in a nitrogen atmosphere in the same five-neck round-bottom flask as used in Synthesis Example 1 to provide a solution.

30.68 g (0.14 mol) of HPMDA and 51.51 g of NMP each were added thereto at once respectively, and the flask was heated with a mantle heater to increase the temperature in the reaction system to 200° C. over about 20 minutes. The temperature in the reaction system was maintained at 200° C. for 3 hours while collecting the components distilled off. After adding 88.49 g of N,N-dimethylacetamide (DMAC, available from Mitsubishi Gas Chemical Co., Inc.), the content was stirred around 130° C. for about 30 minutes to provide a homogeneous solution, which was air-cooled to 100° C. over about 10 minutes to provide a polyimide (a5) solution having a solid concentration of 20% by weight. The polyimide (a5) solution was gradually poured into 2 L of methanol to precipitate a polyimide (a5) solid. The polyimide (a5) solid was washed with methanol and allowed to stand in a dryer at 80° C. for 24 hours to provide a polyimide (a5). The IR spectrum of the polyimide (a5) showed characteristic absorption of an imide ring, v (C=O) 1,774 and 1,705 cm$^{-1}$, and thus formation of polyimide was confirmed. The polyimide (a5) had an amino group concentration of 0.23 (meq/g), and the residual amount of amino groups that were to be consumed by imidation was 0.3%.

Preparation Example 1

Preparation of Liquid B1

24.61 g (0.064 mol) of N,N'-(4,4'-diphenylmethane)bismaleimide (BMI-H, a trade name, available from KI Chemical Industry Co., Ltd.) and 248.34 g of 1,3-dioxolane were charged under a nitrogen stream in a 500-mL five-neck round-bottom flask equipped with a thermometer, a stirrer, a nitrogen introducing tube, a dropping funnel with a side tube, a Dean-Stark apparatus and a condenser tube, and were completely dissolved by stirring at room temperature for 1 hour to provide a liquid B1.

Preparation Example 2

Preparation of Liquid B2

28.51 g (0.046 mol) of N,N'-(4,4'-bis(3-methyl-5-ethylphenyl)methane)bismaleimide (BMI-70, a trade name, available from KI Chemical Industry Co., Ltd.) and 252.24 g of 1,3-dioxolane were charged under a nitrogen stream in the same 500-mL five-neck round-bottom flask as used in Preparation Example 1, and were completely dissolved by stirring at room temperature for 1 hour to provide a liquid B2.

Example 1

Production of Thermosetting Polyimide Resin Composition 1

The whole amount of the polyimide (a1) obtained in Synthesis Example 1 as the liquid A and the whole amount of the liquid B1 obtained in Preparation Example 1 were charged under a nitrogen stream in a 500-mL five-neck round-bottom flask equipped with a thermometer, a stirrer, a nitrogen introducing tube, a dropping funnel with a side tube and a condenser tube, and were completely dissolved by stirring at room temperature (25° C.) for 1 hour to provide a thermosetting polyimide resin composition 1 having a non-volatile component concentration of 50% by weight. The solution viscosity of the thermosetting polyimide resin composition 1 measured was 0.16 Pa·s.

The thermosetting polyimide resin composition 1 was coated on an aluminum plate having a dimension of 150 mm×150 mm and a thickness of 1 mm to a coated thickness of 0.30 mm and placed in a dryer at 150° C. for 10 hours for distilling the volatile components and curing, whereby a cured product having adhesiveness of the thermosetting polyimide resin composition 1 having a thickness of 0.15 mm was obtained. The cured product having adhesiveness of the thermosetting polyimide resin composition 1 was measured for 90° peeling adhesion force (N per 25 mm), and it was 1.24 (N per 25 mm). It was good in adhesion deposit property. The operation of measuring the 90° peeling adhesion force was repeated 5 times in total on the same position of the cured product having adhesiveness of the thermosetting polyimide resin composition 1. The 90° peeling adhesion force of the fifth measurement was 1.22 (N per 25 mm). It was good in adhesion deposit property. Accordingly, it was confirmed that the adhesiveness suffered substantially no change even when the adhesion and peeling operation was repeated. The cured product having adhesiveness of the thermosetting polyimide resin composition 1 was peeled off from the aluminum plate with a scraper, and it was confirmed that the cured product was a flexible film. The cured product having adhesiveness of the thermosetting polyimide resin composition 1 was immersed in DMAC and then dried to determine as to whether or not the weight thereof was decreased, and it was confirmed that there was substantially no decrease in weight, and thus substantially no uncured component. The cured product having adhesiveness of the thermosetting polyimide resin composition 1 was subjected to thermogravimetric analysis. The weight decrease in terms of percent upon retaining at 250° C. for 1 hour was 1.29%, and thus it was confirmed that the decrease in weight is small.

Example 2

Production of Thermosetting Polyimide Resin Composition 2

The whole amount of the polyimide (a1) obtained in Synthesis Example 1 as the liquid A and the whole amount of the liquid B2 obtained in Preparation Example 2 were charged under a nitrogen stream in the same five-neck round-bottom flask as used in Example 1, and were completely dissolved by stirring at room temperature (25° C.) for 1 hour to provide a thermosetting polyimide resin composition 2 having a non-volatile component concentration of 50% by weight. The solution viscosity of the thermosetting polyimide resin composition 2 measured was 0.18 Pa·s. The thermosetting polyimide resin composition 2 was coated on the same aluminum plate as in Example 1 to a coated thickness of 0.30 mm and placed in a dryer at 150° C. for 10 hours for distilling the volatile components and curing, whereby a cured product having adhesiveness of the thermosetting polyimide resin composition 2 having a thickness of 0.15 mm was obtained. The cured product having adhesiveness of the thermosetting polyimide resin composition 2 was measured for 90° peeling adhesion force (N per 25 mm), and it was 4.47 (N per 25 mm). It was good in adhesion deposit property. The cured product having adhesiveness of the thermosetting polyimide resin composition 2 was peeled off from the aluminum plate with a scraper, and it was confirmed that the cured product was a flexible film. The cured product having adhesiveness of the thermosetting polyimide resin composition 2 was immersed in DMAC and then dried to determine as to whether or not the weight thereof was decreased, and it was confirmed that there was substantially no decrease in weight, and thus substantially no uncured component. The cured product having adhesiveness of the thermosetting polyimide resin composition 2 was subjected to thermogravimetric analysis. The weight decrease in terms of percent upon retaining at 250° C. for 1 hour was 1.00%, and thus it was confirmed that the decrease in weight is small.

Example 3

Production of Thermosetting Polyimide Resin Composition 3

The whole amount of the polyimide (a2) obtained in Synthesis Example 2 as the liquid A and the whole amount of the liquid B1 obtained in Preparation Example 1 were charged under a nitrogen stream in the same five-neck round-bottom flask as used in Example 1, and were completely dissolved by stirring at room temperature (25° C.) for 1 hour to provide a thermosetting polyimide resin composition 3 having a non-volatile component concentration of 50% by weight. The solution viscosity of the thermosetting polyimide resin composition 3 measured was 0.19 Pa·s. The thermosetting polyimide resin composition 3 was coated on the same aluminum plate as in Example 1 to a coated thickness of 0.30 mm and placed in a dryer at 150° C. for 10 hours for distilling the volatile components and curing, whereby a cured product having adhesiveness of the thermosetting polyimide resin composition 3 having a thickness of 0.15 mm was obtained. The cured product having adhesiveness of the thermosetting polyimide resin composition 3 was measured for 90° peeling adhesion force (N per 25 mm), and it was 0.49 (N per 25 mm). It was good in adhesion deposit property. The cured product having adhesiveness of the thermosetting polyimide resin composition 3 was peeled off from the aluminum plate with a scraper, and it was confirmed that the cured product was a flexible film. The cured product having adhesiveness of the thermosetting polyimide resin composition 3 was immersed in DMAC and then dried to determine as to whether or not the weight thereof was decreased, and it was confirmed that there was substantially no decrease in weight, and thus substantially no uncured component. The cured product having adhesiveness of the thermosetting polyimide resin composition 3 was subjected to thermogravimetric analysis. The weight decrease in terms of percent upon retaining at 250° C. for 1 hour was 1.21%, and thus it was confirmed that the decrease in weight is small.

Example 4

Production of Thermosetting Polyimide Resin Composition 4

The whole amount of the polyimide (a3) obtained in Synthesis Example 3 as the liquid A and the whole amount of the liquid B1 obtained in Preparation Example 1 were charged under a nitrogen stream in the same five-neck round-bottom flask as used in Example 1, and were completely dissolved by stirring at room temperature for 1 hour to provide a thermosetting polyimide resin composition 4 having a non-volatile component concentration of 50% by weight. The solution viscosity of the thermosetting polyimide resin composition 4 measured was 0.13 Pa·s. The thermosetting polyimide resin composition 4 was coated on the same aluminum plate as in Example 1 to a coated thickness of 0.30 mm and placed in a dryer at 150° C. for 10 hours for distilling the volatile components and curing, whereby a cured product having adhesiveness of the thermosetting polyimide resin composition 4 having a thickness of 0.15 mm was obtained. The cured product having adhesiveness of the thermosetting polyimide resin composition 4 was measured for 90° peeling adhesion force (N per 25 mm), and it was 0.07 (N per 25 mm). It was good in adhesion deposit property. The cured product having adhesiveness of the thermosetting polyimide resin composition 4 was peeled off from the aluminum plate with a scraper, and it was confirmed that the cured product was a flexible film. The cured product having adhesiveness of the thermosetting polyimide resin composition 4 was immersed in DMAC and then dried to determine as to whether or not the weight thereof was decreased, and it was confirmed that there was substantially no decrease in weight, and thus substantially no uncured component. The cured product having adhesiveness of the thermosetting polyimide resin composition 4 was subjected to thermogravimetric analysis. The weight decrease in terms of percent upon retaining at 250° C. for 1 hour was 1.15%, and thus it was confirmed that the decrease in weight is small.

Example 5

Production of Thermosetting Polyimide Resin Composition 5

The whole amount of the polyimide (a4) obtained in Synthesis Example 4 as the liquid A and the whole amount of the liquid B1 obtained in Preparation Example 1 were charged under a nitrogen stream in the same five-neck round-bottom flask as used in Example 1, and were completely dissolved by stirring at room temperature for 1 hour to provide a thermosetting polyimide resin composition 5 having a non-volatile component concentration of 50% by weight. The solution viscosity of the thermosetting polyimide resin composition 4 measured was 0.15 Pa·s. The thermosetting polyimide resin composition 5 was coated on the same aluminum plate as in Example 1 to a coated thickness of 0.30 mm and placed in a dryer at 150° C. for 10 hours for distilling the volatile components and curing, whereby a cured product having adhesiveness of the thermosetting polyimide resin composition 5 having a thickness of 0.15 mm was obtained. The cured product having adhesiveness of the thermosetting polyimide resin composition 5 was measured for 90° peeling adhesion force (N per 25 mm), and it was 1.48 (N per 25 mm). It was good in adhesion deposit property. The cured product having adhesiveness of the thermosetting polyimide resin composition 5 was peeled off from the aluminum plate with a scraper, and it was confirmed that the cured product was a flexible film. The cured product having adhesiveness of the thermosetting polyimide resin composition 5 was immersed in DMAC and then dried to determine as to whether or not the weight thereof was decreased, and it was confirmed that there was substantially no decrease in weight, and thus substantially no uncured component. The cured product having adhesiveness of the thermosetting polyimide resin composition 5 was subjected to thermogravimetric analysis. The weight decrease in terms of percent upon retaining at 250° C. for 1 hour was 1.31%, and thus it was confirmed that the decrease in weight is small.

Comparative Example 1

Production of Cured Product of Peroxide Curing-Type Silicone Adhesive

A peroxide curing-type silicone adhesive, KR-101-10, produced by Shin-Etsu Chemical Co., Ltd., was coated on the same aluminum plate as in Example 1 to a coated thickness of 0.30 mm and placed in a dryer at 150° C. for 10 hours for curing, whereby a silicone cured product having a thickness of 0.15 mm was obtained. The silicone cured product formed on the aluminum plate was measured for 90° peeling adhesion force (N per 25 mm), and it was 7.63 (N per 25 mm). It was poor in adhesion deposit property since adhesion of an adhesive substance, which was considered as being derived from the silicone cured product, was confirmed on Kapton 200H as the adherend. The silicone cured product formed on the aluminum plate was placed in a dryer at 200° C. for 3 hours for further curing, and then measured for 90° peeling adhesion force (N per 25 mm), and it was 7.35 (N per 25 mm). It was poor in adhesion deposit property since adhesion of an adhesive substance, which was considered as being derived from the silicone cured product, was confirmed on Kapton 200H as the adherend. The silicone cured product was subjected to thermogravimetric analysis. The weight decrease in terms of percent upon retaining at 250° C. for 1 hour was 1.56%.

Comparative Example 2

The whole amount of the polyimide (a5) obtained in Synthesis Example 5 as the liquid A, 273.15 g of DMAC and the whole amount of the liquid B1 obtained in Preparation Example 1 were charged under a nitrogen stream in the same five-neck round-bottom flask as used in Example 1, and were completely dissolved by stirring at room temperature for 5 hours to provide a thermosetting polyimide resin composition solution having a solid component concentration of 10% by weight. The thermosetting polyimide resin composition solution was coated on the same aluminum plate as in Example 1 to a coated thickness of 0.50 mm and placed in a dryer at 150° C. for 10 hours and in a vacuum dryer at 180° C. for 2 hours for distilling the solvent and curing, whereby a cured product having a thickness of 0.05 mm was obtained. The cured product had completely no adhesiveness.

The conditions and results of Examples and Comparative Examples are shown in Table 1 below.

TABLE 1

| | | Liquid A | | Liquid B | | | | 90° peeling adhesion force | | Thermo-gravimetric analysis (% by weight) | Adhesion deposit property |
| | | Molar number | | | Molar number BMI | Molar ratio (BMI/acid component) | Viscosity (Pa·s) | First (N/25 mm) | Fifth (N/25 mm) | | |
| | Name | Acid component | Diamine | Name | | | | | | | |
| Example | | | | | | | | | | | |
| 1 | a1 | HPMDA 0.161 | ED-900 0.202 | B1 | 0.064 | 0.40 | 0.16 | 1.24 | 1.22 | 1.29 | good for both cases |
| 2 | a1 | HPMDA 0.161 | ED-900 0.202 | B2 | 0.064 | 0.40 | 0.18 | 4.47 | | 1.00 | good |
| 3 | a2 | PMDA 0.162 | ED-900 0.202 | B1 | 0.064 | 0.40 | 0.19 | 0.49 | | 1.21 | good |
| 4 | a3 | HPMDA 0.312 | D-400 0.39 | B1 | 0.064 | 0.21 | 0.13 | 0.07 | | 1.15 | good |
| 5 | a4 | HPMA 0.161 | ED-900 0.202 | B1 | 0.064 | 0.40 | 0.15 | 1.48 | | 1.31 | good |
| Comparative Example | | | | | | | | | | | |
| 1 | Shin-Etsu Silicone | | | | | | | 7.35 | | 1.56 | poor |
| 2 | a5 | HPMDA 0.137 | ODA 0.171 | B1 | 0.064 | 0.47 | — | — | | — | — |

INDUSTRIAL APPLICABILITY

The thermosetting polyimide resin composition of the present invention is a two-component type and cured at a temperature of 150° C. or less, and the cured product thereof has such characteristics that it not only has flexibility and heat resistance such as causing a less decrease in the weight even under heating to 250° C., but also has adhesiveness. The liquid A containing the polyimide (a) as a precursor of the thermosetting polyimide resin composition can be synthesized in the absence of a solvent, and can be diluted with a low boiling point solvent, such as tetrahydrofuran, acetone and the like. Accordingly, a solution having a high solid component concentration can be obtained, thereby providing well balanced characteristics in rationalization of working process by reducing the drying time on providing the polyimide cured product, and in safety and health by reducing the amount of solvent discharged on drying. Therefore, the thermosetting polyimide resin composition of the present invention and the cure product thereof are favorably used for a purpose requiring both heat resistance and adhesiveness, for example, a heat resistant adhesive material, and an electric insulating material or the like as engineering plastics.

The invention claimed is:

1. A two-component thermosetting polyimide resin composition comprising: a liquid A containing a polyimide (a) which is produced by mixing a tetracarboxylic acid component containing at least one compound selected from a tetracarboxylic dianhydride represented by formula (1), a tetracarboxylic acid and a derivative of the tetracarboxylic acid represented by formula (2), with a polyoxyalkylenediamine represented by formula (3), in such a manner that a number of moles of the polyoxyalkylenediamine is from 1.01 to 2 times the number of moles of the tetracarboxylic acid component, and by being subjected to reaction of the mixture under heating; and a liquid B containing a bismaleimide compound represented by formula (4) and a solvent:

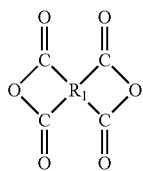
(1)

(wherein $R_1$ represents a tetravalent organic group)

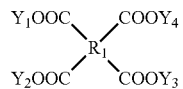
(2)

(wherein $R_1$ represents a tetravalent organic group; and $Y_1$ to $Y_4$ each independently represent hydrogen or a hydrocarbon group having from 1 to 8 carbon atoms)

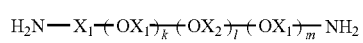
(3)

(wherein $X_1$ and $X_2$ each represents a $C_1$ to $C_4$ alkylene group; k and m each represent a repeating number of the $OX_1$ unit; and l represents a repeating number of the $OX_2$ unit, where k+m is a number within a range of from 1 to 90 in terms of number average polymerization degree (provided that m is not 0), and l is a number within a range of from 0 to 80 in terms of number average polymerization degree)

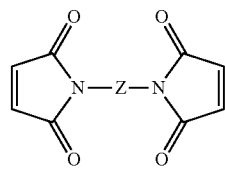
(4)

(wherein Z represents a divalent organic group.).

2. The two-component thermosetting polyimide resin composition according to claim 1, wherein $R_1$ in each of formula (1) and formula (2) represents at least one selected from a tetravalent group derived from cyclohexane and a tetravalent group derived from benzene.

3. The two-component thermosetting polyimide resin composition according to claim 1, wherein $R_1$ in each of formula (1) and formula (2) represents a tetravalent group derived from cyclohexane.

4. The two-component thermosetting polyimide resin composition according to claim 1, wherein the polyoxyalkylenediamine is a polyoxyalkylenediamine comprising a skeleton derived from propylene oxide and ethylene oxide represented by formula (5):

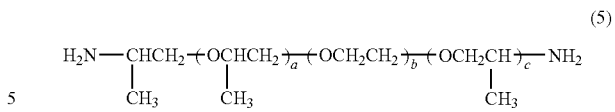
(5)

(wherein a and c each represent a repeating number of the propylene oxide unit; and b represents a repeating number of the ethylene oxide unit.).

5. The two-component thermosetting polyimide resin composition according to claim 1, wherein the polyoxyalkylenediamine is a polyoxyalkylenediamine comprising a polypropylene oxide skeleton represented by formula (6):

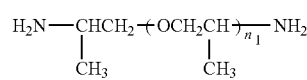
(6)

(wherein $n_1$ represents a repeating number of the propylene oxide unit.).

6. The two-component thermosetting polyimide resin composition according to claim 1, wherein the polyimide (a) is produced by reacting the tetracarboxylic acid component with the polyoxyalkylenediamine under heating at a temperature of from 150 to 260° C. for from 1 to 12 hours.

7. The two-component thermosetting polyimide resin composition according to claim 1, wherein the bismaleimide compound is N,N'-(4,4'-diphenylmethane)bismaleimide or N,N'-(4,4'-bis(3-methyl-5-ethylphenyl)methane)bismaleimide.

8. The two-component thermosetting polyimide resin composition according to claim 1, wherein the solvent in the liquid B is 1,3-dioxolane.

9. A thermosetting polyimide resin composition which is produced by mixing the liquid A and the liquid B of the two-component thermosetting polyimide resin composition according to claim 1.

10. The thermosetting polyimide resin composition according to claim 9, wherein upon mixing the liquid A and the liquid B, the bismaleimide compound contained in the liquid B is mixed in an amount of from 0.05 to 4 mol with 1 mol of a unit derived from the tetracarboxylic acid component of the polyimide (a) in the liquid A.

11. The thermosetting polyimide resin composition according to claim 10, wherein the polyamide (a) is produced by mixing the polyoxyalkylenediamine in a ratio of from 1.25 to 2 mol with 1 mol of the tetracarboxylic acid component.

12. The thermosetting polyimide resin composition according to claim 9, wherein the polyamide (a) is produced by mixing the polyoxyalkylenediamine in a ratio of from 1.25 to 2 mol with 1 mol of the tetracarboxylic acid component, and upon mixing the liquid A and the liquid B, the bismaleimide compound contained in the liquid B is mixed in an amount of from 0.15 to 2 mol with 1 mol of a unit derived from the tetracarboxylic acid component of the polyimide (a) in the liquid A.

13. The thermosetting polyimide resin composition according to claim 9, wherein the liquid A and the liquid B are mixed with each other at a temperature of from 0 to 80° C.

14. A cured product having an adhesiveness of from 0.001 to 250 N per 25 mm in terms of peeling adhesion force which is produced by curing under heating the thermosetting polyimide resin composition according to claim 9 at from 50 to 150° C. for from 0.5 to 10 hours.

15. A liquid polyimide which is produced by mixing a tetracarboxylic acid component containing at least one compound selected from a tetracarboxylic dianhydride represented by formula (1), a tetracarboxylic acid and a derivative of the tetracarboxylic acid represented by formula (2), with a polyoxyalkylenediamine represented by formula (3) in such a manner that a number of moles of the polyoxyalkylenediamine is from 1.01 to 2 times the number of moles of the tetracarboxylic acid component, and by being subjected to reaction of the mixture under heating:

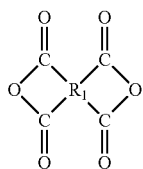
(1)

(wherein $R_1$ represents a tetravalent organic group)

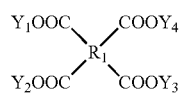
(2)

(wherein $R_1$ represents a tetravalent organic group; and $Y_1$ to $Y_4$ each independently represent hydrogen or a hydrocarbon group having from 1 to 8 carbon atoms)

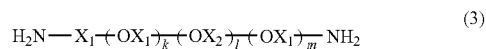
(3)

(wherein $X_1$ and $X_2$ each represents a $C_1$ to $C_4$ alkylene group; k and m each represent a repeating number of the $OX_1$ unit; and l represents a repeating number of the $OX_2$ unit, where k+m is a number within a range of from 1 to 90 in terms of number average polymerization degree (provided that m is not 0), and l is a number within a range of from 0 to 80 in terms of number average polymerization degree.).

16. A method of producing a two-component thermosetting polyimide resin composition comprising mixing the liquid polyimide according to claim 15 with a liquid B containing a bismaleimide compound represented by formula (4)

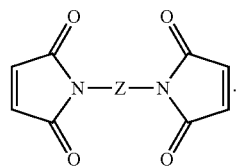
(4)

* * * * *